United States Patent
Shimizu et al.

(10) Patent No.: US 11,268,317 B2
(45) Date of Patent: Mar. 8, 2022

(54) METHOD FOR MANUFACTURING GLASS PANEL UNIT

(71) Applicant: Panasonic Intellectual Property Management Co., Ltd., Osaka (JP)

(72) Inventors: Takeshi Shimizu, Toyama (JP); Kazuya Hasegawa, Osaka (JP); Masataka Nonaka, Osaka (JP); Hiroyuki Abe, Osaka (JP); Eiichi Uriu, Osaka (JP); Haruhiko Ishikawa, Osaka (JP); Tasuku Ishibashi, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 149 days.

(21) Appl. No.: 16/617,496

(22) PCT Filed: May 25, 2018

(86) PCT No.: PCT/JP2018/020127
§ 371 (c)(1),
(2) Date: Nov. 26, 2019

(87) PCT Pub. No.: WO2018/221396
PCT Pub. Date: Dec. 6, 2018

(65) Prior Publication Data
US 2020/0157876 A1    May 21, 2020

(30) Foreign Application Priority Data
May 31, 2017    (JP) .............................. JP2017-108712

(51) Int. Cl.
*E06B 3/673*    (2006.01)
*E06B 3/663*    (2006.01)
(Continued)

(52) U.S. Cl.
CPC .......... *E06B 3/66342* (2013.01); *E06B 3/677* (2013.01); *E06B 3/6736* (2013.01); *E06B 3/67326* (2013.01); *C03C 27/048* (2013.01)

(58) Field of Classification Search
CPC .. E06B 3/67342; E06B 3/677; E06B 3/67326; E06B 3/6736
See application file for complete search history.

(56) References Cited

U.S. PATENT DOCUMENTS

| 8,900,396 B2 * | 12/2014 | Kwon ..................... C03C 27/06 156/293 |
| 2002/0121111 A1 * | 9/2002 | Yoshizawa ............ E06B 3/6775 65/34 |
| 2009/0313946 A1 | 12/2009 | Guo et al. |

FOREIGN PATENT DOCUMENTS

| EP | 3170800 A1 | 5/2017 |
| JP | 2001-354456 A | 12/2001 |

(Continued)

OTHER PUBLICATIONS

International Search Report issued in corresponding International Patent Application No. PCT/JP2018/020127, dated Jul. 24, 2018, with English translation.

*Primary Examiner* — Donald J Loney
(74) *Attorney, Agent, or Firm* — McDermott Will & Emery LLP

(57) ABSTRACT

A first substrate, having an evacuation port, and a second substrate are bonded together with a first sealing material in a frame shape interposed between them to create an internal space. The internal space is evacuated through the evacuation port, and the evacuation port is sealed up with the internal space kept evacuated. At this time, a second sealing material inserted into the evacuation port is heated and melted while being pressed toward the second substrate such that the evacuation port is sealed up with the second sealing (Continued)

material melted. The evacuation port and the second sealing material have dissimilar shapes when viewed along the center axis of the evacuation port in a state where the second sealing material has been inserted into the evacuation port but has not melted yet.

13 Claims, 18 Drawing Sheets

(51) Int. Cl.
*E06B 3/677* (2006.01)
*C03C 27/04* (2006.01)

(56) References Cited

FOREIGN PATENT DOCUMENTS

| JP | 2010-004044 A | 1/2010 |
|---|---|---|
| WO | 2016/009949 A1 | 1/2016 |

* cited by examiner

METHOD FOR MANUFACTURING GLASS PANEL UNIT

CROSS-REFERENCE OF RELATED APPLICATIONS

This application is the U.S. National Phase under 35 U.S.C. § 371 of International Patent Application No. PCT/JP2018/020127, filed on May 25, 2018, which in turn claims the benefit of Japanese Patent Application No. 2017-108712, filed on May 31, 2017, the entire disclosures of which Applications are incorporated by reference herein.

TECHNICAL FIELD

The present disclosure generally relates to a method for manufacturing a glass panel unit.

BACKGROUND ART

A thermally insulating glass panel unit is obtained by evacuating an internal space between a pair of substrates that are arranged to face each other and by hermetically sealing the internal space while keeping the internal space evacuated.

Patent Literature 1 discloses a technique, according to which an evacuation pipe of glass is connected to an evacuation port that one of a pair of substrates has, the internal space is evacuated through the evacuation pipe, and then the evacuation pipe is heated and cut off.

In a glass panel unit manufactured by this technique, traces of the evacuation pipe cut off are left protruding from the outer surface of the glass panel unit.

CITATION LIST

Patent Literature

Patent Literature 1: JP 2001-354456 A

SUMMARY OF INVENTION

It is therefore an object of the present disclosure to provide a glass panel unit having an evacuated internal space with no traces of the evacuation pipe left.

A glass panel unit manufacturing method according to an implementation of the present disclosure includes a bonding step, an evacuating step, and a sealing step. The bonding step includes bonding together a first substrate and a second substrate with a first sealing material in a frame shape interposed between the first and second substrates to create, between the first and second substrates, an internal space surrounded with the first sealing material. The first substrate includes a glass pane and has an evacuation port. The second substrate includes another glass pane. The evacuating step includes evacuating the internal space through the evacuation port of the first substrate. The sealing step includes sealing the evacuation port up while keeping the internal space evacuated. The sealing step includes heating and melting a second sealing material inserted into the evacuation port, while pressing the second sealing material toward the second substrate, and thereby sealing the evacuation port up with the second sealing material thus melted. The evacuation port and the second sealing material have dissimilar shapes when viewed along a center axis of the evacuation port in a state where the second sealing material has been inserted into the evacuation port but has not melted yet.

DESCRIPTION OF EMBODIMENTS

A configuration for a glass panel unit according to an exemplary embodiment will be described with reference to the accompanying drawings. Note that on the drawings, respective constituent members of a glass panel unit according to the exemplary embodiment are depicted only schematically.

Figure 1:
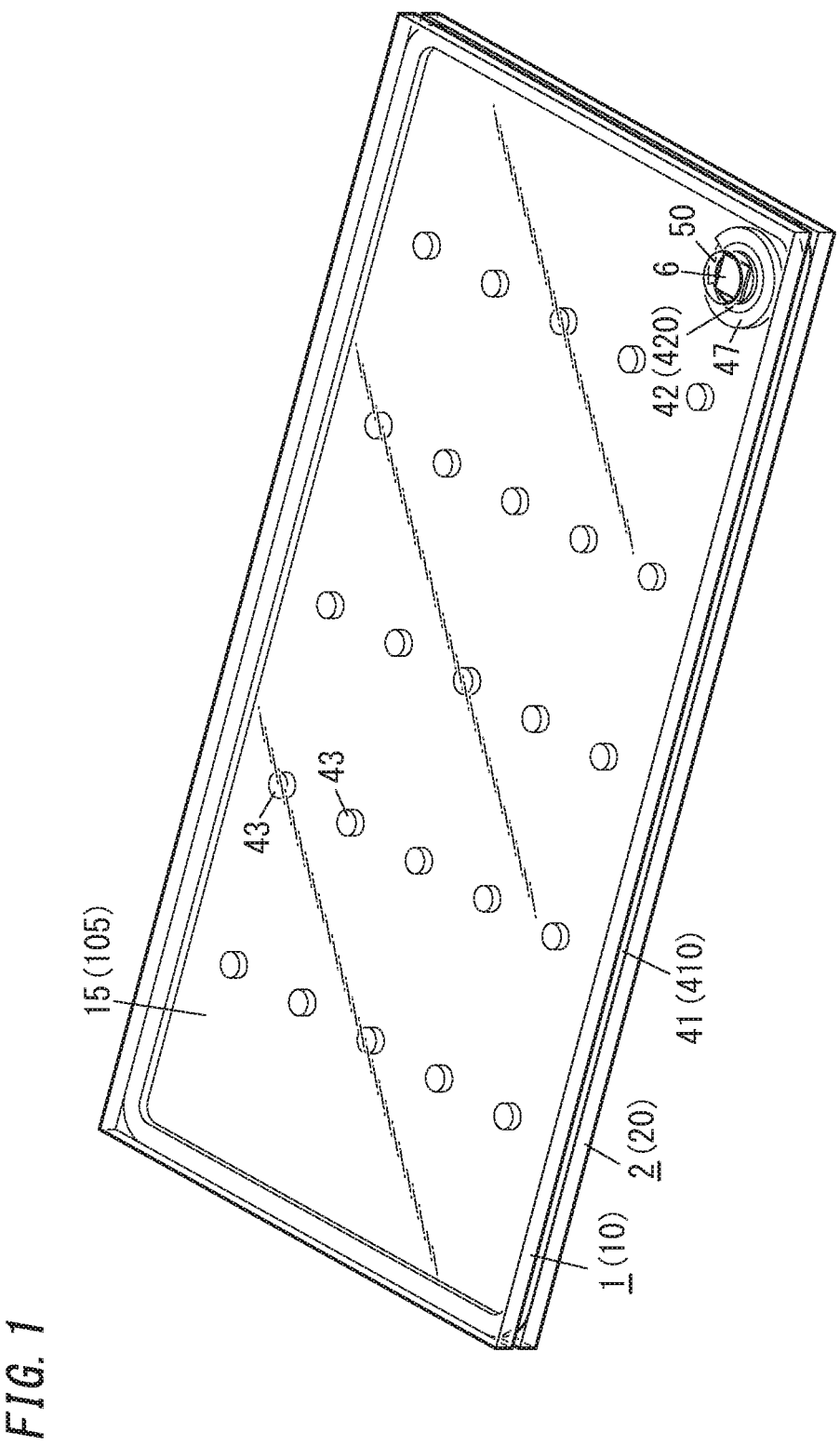
FIG. 1 is a perspective view of a glass panel unit according to an exemplary embodiment.
Figure 2:
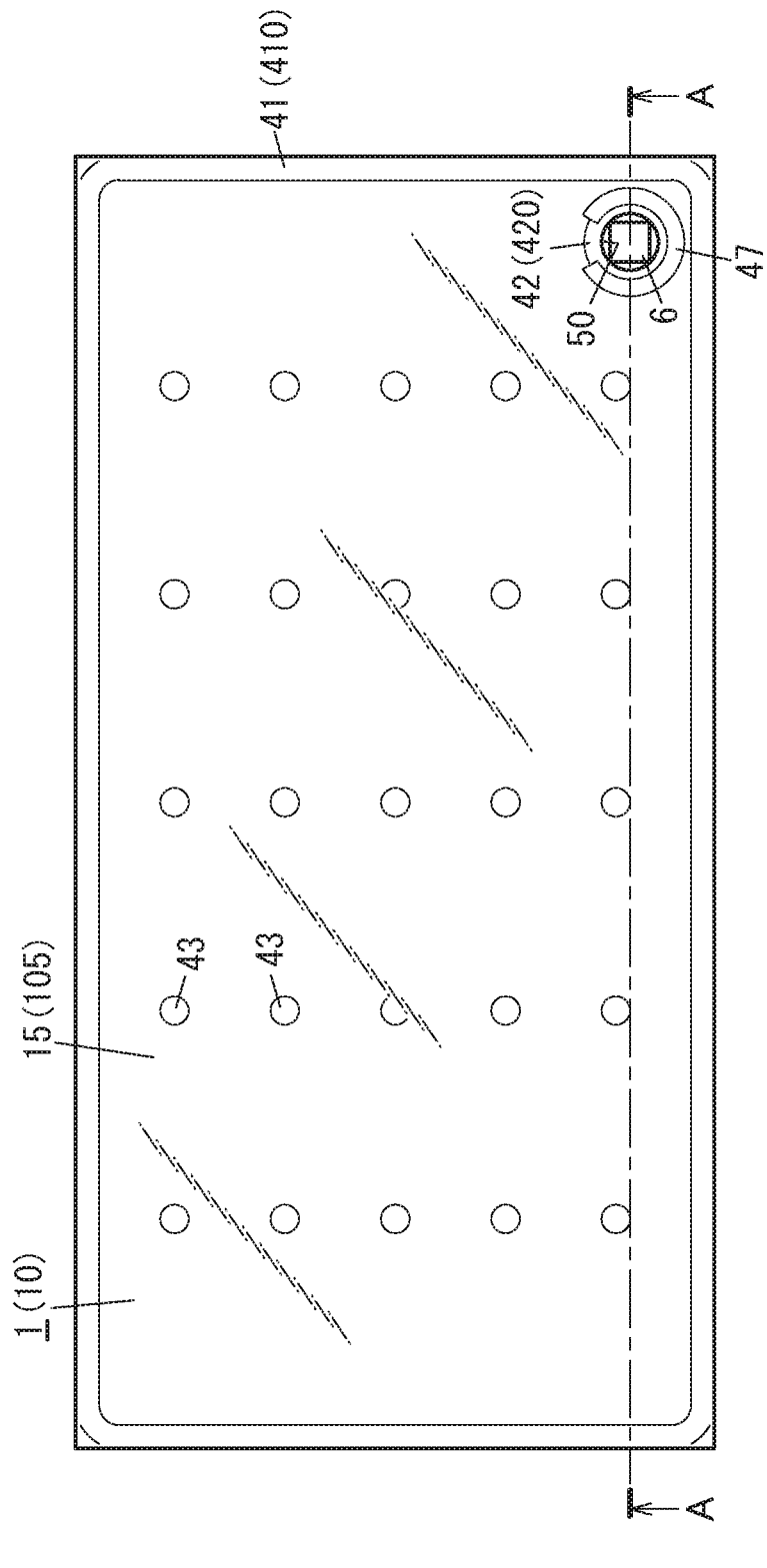
FIG. 2 is a plan view of the glass panel unit.
Figure 3:
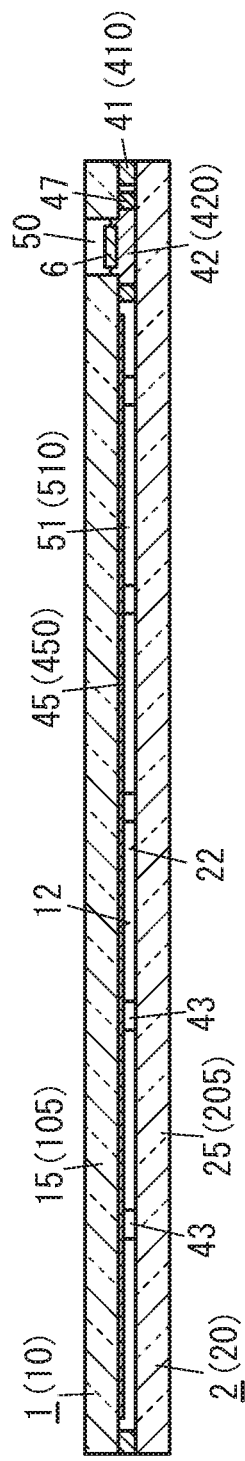
FIG. 3 is a cross-sectional view thereof taken along the plane A-A shown in FIG. 2.

As shown in FIGS. 1-3, a glass panel unit according to this exemplary embodiment includes a first panel 1, a second panel 2, a first sealing portion 41, a second sealing portion 42, a plate 6, a plurality of pillars 43, and a dam 47.

The first panel 1 and the second panel 2 are arranged to face each other with a narrow gap left between them. The first panel 1 and the second panel 2 are parallel to each other. Between the first panel 1 and the second panel 2, located are the first sealing portion 41, the second sealing portion 42, the plurality of pillars 43, and the dam 47.

The first panel 1 includes a glass pane 15 and a low-emissivity film 45 (see FIG. 3) bonded onto the glass pane 15. The low-emissivity film 45 has the capability of reducing the transfer of heat due to radiation. The second panel 2 includes a glass pane 25.

In the following description, the glass pane 15 will be hereinafter referred to as a "first glass pane 15" and the glass pane 25 will be hereinafter referred to as a "second glass pane 25." The first glass pane 15 and the second glass pane 25 may be configured as any of various types of glass panes made of soda lime glass, high strain point glass, chemically tempered glass, alkali-free glass, quartz glass, Neoceram, thermally tempered glass, or any other suitable glass.

Most of a counter surface 12, facing the second panel 2, of the first panel 1 is constituted of the surface of the low-emissivity film 45. A counter surface 22, facing the first panel 1, of the second panel 2 is constituted of the surface of the second glass pane 25.

The first sealing portion 41 is formed in a frame shape and may be made of a glass frit, for example. The first sealing portion 41 is hermetically bonded to respective peripheral portions of the first and second panels 1 and 2. In other words, the respective peripheral portions of the first and second panels 1 and 2 are hermetically bonded together with the first sealing portion 41.

The plurality of pillars 43 are dispersed so as to be spaced apart from each other. Each of the pillars 43 is arranged in contact with both of the respective counter surfaces 12 and 22 of the first and second panels 1 and 2 (see FIG. 3).

The plurality of pillars 43 are arranged to be surrounded with the first sealing portion 41 in the frame shape. The plurality of pillars 43 has the capability of keeping a predetermined gap distance between the first and second panels 1 and 2. The plurality of pillars 43 is suitably either transparent or semi-transparent. The material, shape, arrangement pattern, and other parameters of the plurality of pillars 43 may be determined appropriately.

In the glass panel unit according to this exemplary embodiment, an evacuation port 50 is provided for the first panel 1, out of the two panels 1 and 2 (namely, the first and second panels 1 and 2). The evacuation port 50 will be used to evacuate the internal space in a process step (i.e., an evacuating step to be described later) during the manufacturing process of the glass panel unit according to this exemplary embodiment. The evacuation port 50 penetrates through the first panel 1 in a thickness direction.

The evacuation port 50 is sealed hermetically with the second sealing portion 42. The second sealing portion 42 may be made of a glass frit, for example.

The internal space 51, surrounded with the first panel 1, the second panel 2, and the first sealing portion 41, is sealed hermetically by sealing up, in a process step (i.e., a sealing step to be described later) during the manufacturing process of the glass panel unit according to this exemplary embodiment, the evacuation port 50 that communicated with the internal space 51. The hermetically sealed internal space 51 may be a thermally insulated space, which has been evacuated to a degree of vacuum of 0.1 Pa or less, for example.

A plate 6 is arranged in the evacuation port 50. The plate 6 has an outside diameter, which is smaller by one step than the diameter of the evacuation port 50. The plate 6 may be made of a metal, for example.

The plate 6 is located opposite from the second panel 2 with respect to the second sealing portion 42. The plate 6 is a member that will be used to apply pressure to a second sealing material 420 in a process step (i.e., a sealing step to be described later) during the manufacturing process of the glass panel unit according to this exemplary embodiment.

It is recommended that the evacuation port 50 be further stuffed with resin such that the plate 6 is covered with the stuffing resin. This not only protects the evacuation port 50 but also eliminates a recess from the surface of the glass panel unit.

In the internal space 51, the second sealing portion 42 is bonded strongly onto the respective counter surfaces 12 and 22 of the first and second panels 1 and 2. The second sealing portion 42 is bonded hermetically onto a portion, surrounding the evacuation port 50, of the counter surface 12 of the first panel 1. In addition, the second sealing portion 42 is also bonded hermetically onto a portion facing the evacuation port 50, and a portion surrounding the evacuation port 50, of the counter surface 22 of the second panel 2.

The low-emissivity film 45, bonded onto one surface (facing the second panel 2) of the first glass pane 15 in the thickness direction D1, is arranged to face the internal space 51.

The dam 47 may be made of a glass frit, for example, and may be formed in the shape of an incomplete ring. For example, the dam 47 may be a C-ring. The dam 47 is suitably made of the same material as the first sealing portion 41 and suitably made of the same material as the pillars 43 as well.

The dam 47 is arranged in the internal space 51 so as to surround the opening formed by the evacuation port 50. The dam 47 may be bonded to all of the first panel 1 (first glass pane 15), the second panel 2 (second glass pane 25), and the second sealing portion 42. Alternatively, the dam 47 may be bonded to only one of the first and second panels 1 and 2 (e.g., to only the second panel 2).

In the glass panel unit according to the exemplary embodiment with such a configuration, the internal space 51 sealed up with the first sealing portion 41 and the second sealing portion 42 is present in an evacuated condition between the first panel 1 and the second panel 2. This allows the glass panel unit according to this exemplary embodiment to exhibit an excellent thermal insulation property. The second sealing portion 42 is strongly bonded, in the internal space 51, to the first panel 1 (first glass pane 15), the second panel 2 (second glass pane 25), and the dam 47. The second sealing portion 42 seals the evacuation port 50 up with high reliability.

Next, respective process steps for manufacturing the glass panel unit according to this exemplary embodiment will be described.

A glass panel unit manufacturing method according to the exemplary embodiment includes a bonding step, an evacuating step, and a sealing step.

Figure 4:
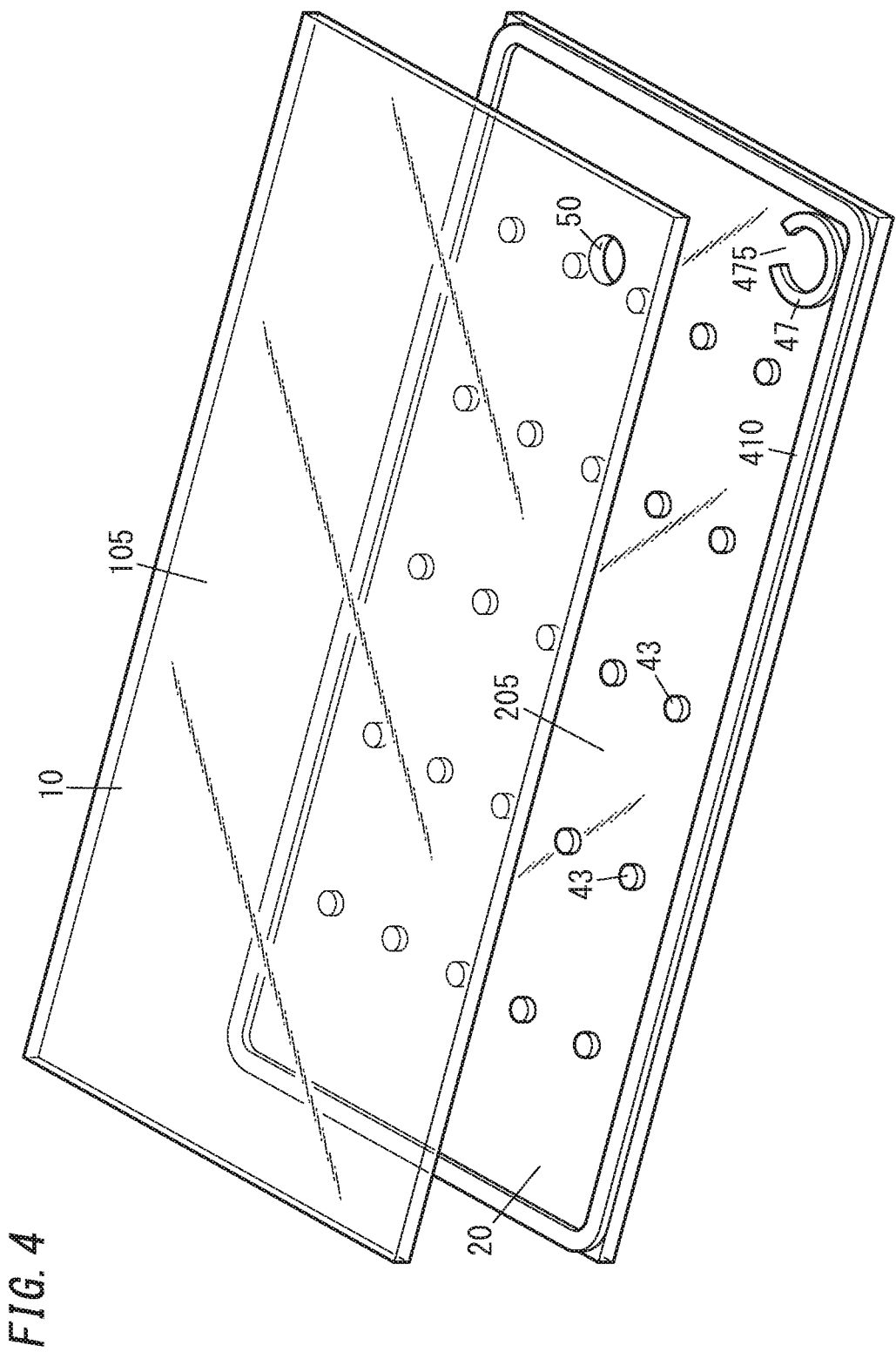
FIG. 4 is a perspective view illustrating a state of a bonding step as a process step for manufacturing the glass panel unit.
Figure 5:
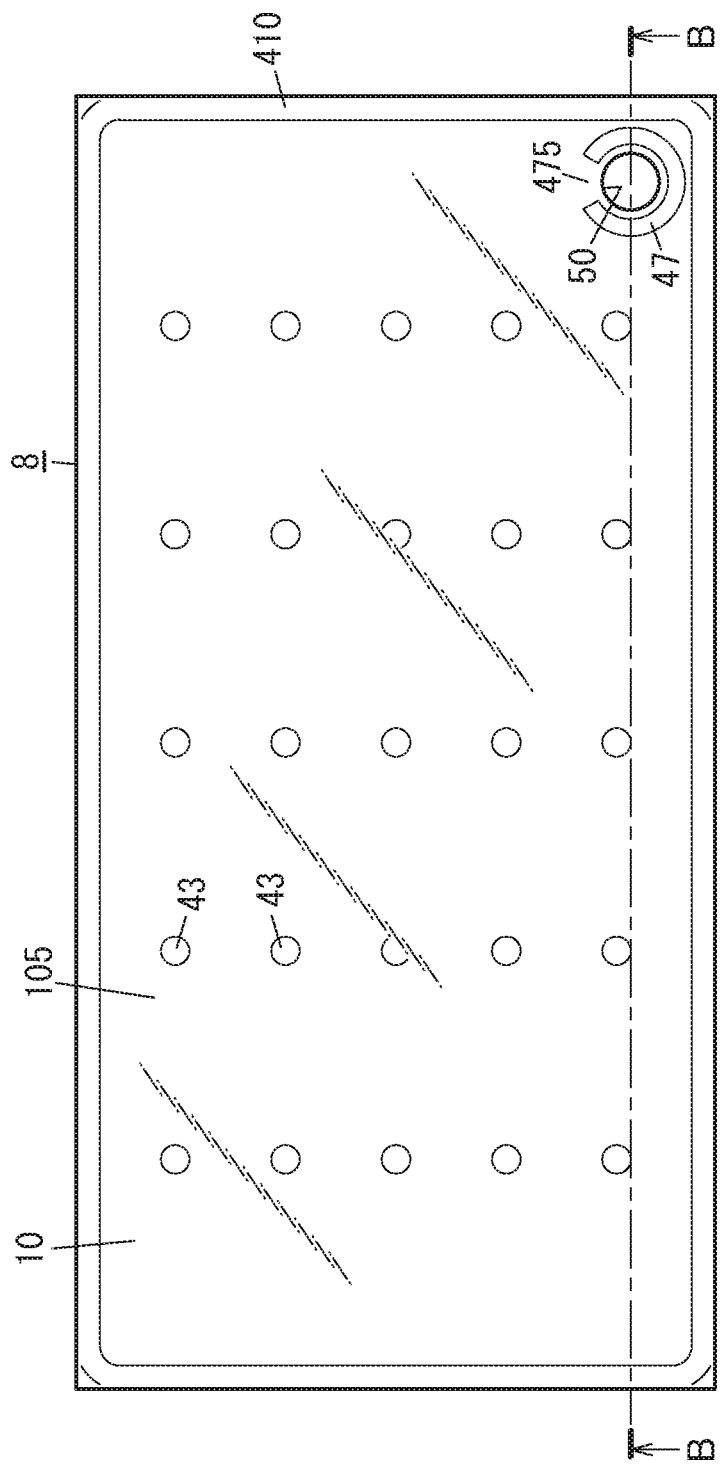
FIG. 5 is a plan view illustrating the next state of the bonding step.
Figure 6:
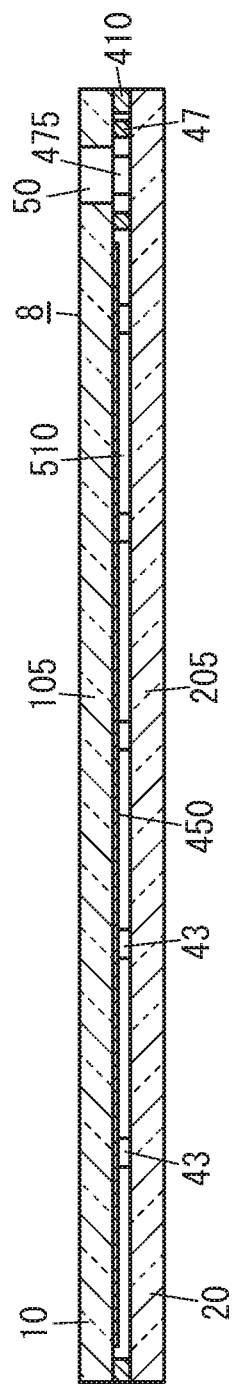
FIG. 6 is a cross-sectional view thereof taken along the plane B-B shown in FIG. 5.

In the bonding step, a first substrate 10, a second substrate 20, a first sealing material 410, a plurality of pillars 43, and a dam 47 are arranged at their respective predetermined positions as shown in FIGS. 4-6. Specifically, the first sealing material 410, the plurality of pillars 43, and the dam 47 are arranged on one surface (upper surface) of the second substrate 20, and the first substrate 10 is arranged over the second substrate 20 to face the second substrate 20.

In the glass panel unit manufacturing method according to the exemplary embodiment, the first substrate 10 will constitute the first panel 1 of the glass panel unit to be obtained as a final product through the respective manufacturing process steps. The second substrate 20 will constitute the second panel 2 of the glass panel unit as a final product, and the first sealing material 410 will constitute the first sealing portion 41 of the glass panel unit as a final product.

The first substrate 10 includes a glass pane 105 and a low-emissivity film 450 bonded onto the glass pane 105. The second substrate 20 includes a glass pane 205. In the following description, the glass pane 105 will be hereinafter referred to as a "first glass pane 105" and the glass pane 205 will be hereinafter referred to as a "second glass pane 205."

In the glass panel unit manufacturing method according to the exemplary embodiment, the first glass pane 105 will constitute the first glass pane 15 of the glass panel unit to be obtained as a final product through the respective manufacturing process steps. The low-emissivity film 450 will constitute the low-emissivity film 45 of the glass panel unit as a final product, and the second glass pane 205 will constitute the second glass pane 25 of the glass panel unit as a final product.

As shown in FIG. 6, most of the counter surface, facing the second substrate 20, of the first substrate 10 is constituted of the surface of the low-emissivity film 450. The counter surface, facing the first substrate 10, of the second substrate 20 is constituted of the surface of the second glass pane 205.

The first substrate 10 (i.e., the first glass pane 105) has an evacuation port 50 penetrating through the first substrate 10 in the thickness direction.

The first sealing material 410 is applied in a frame shape onto the outer periphery of the one surface (upper surface) of the second substrate 20 (second glass pane 205) with an applicator such as a dispenser. A material for the dam 47 is also applied in the shape of a ring with a cut 475 onto a predetermined area of the one surface (upper surface) of the second substrate 20 (second glass pane 205) with an applicator such as a dispenser. The first sealing material 410 and the dam 47 are suitably the same material (such as a glass frit). The dam 47 is formed in a C-ring shape with the cut 475 in this embodiment, but does not have to be formed in such a shape.

The plurality of pillars 43 are arranged in a regular pattern within an area, surrounded with the first sealing material 410, of the one surface of the second substrate 20.

In the bonding step, the first and second substrates 10 and 20 that have been arranged as described above are hermetically bonded together with the first sealing material 410. Specifically, the first substrate 10 and the second substrate 20, which has been loaded with the first sealing material 410, the plurality of pillars 43, and the dam 47 sandwiched between them, are heated in a bonding oven such as a circulating hot air oven. As a result, the first sealing material 410 and dam 47 melt under the heat to be bonded onto the first substrate 10 and the second substrate 20. The first sealing material 410 and the dam 47 are bonded onto respective portions, not covered with the low-emissivity film 450, of the first substrate 10. Note that in this bonding step, the dam 47 does not have to be bonded onto the first substrate 10 but may remain spaced from the first substrate 10.

As a result of this bonding step, as shown in FIG. 6 and other drawings, an internal space 510 is created between the first substrate 10 and the second substrate 20. The internal space 510 is a space surrounded with the first substrate 10, the second substrate 20, and the first sealing material 410, and communicates with the external environment though only the evacuation port 50. Note that since the dam 47 has the cut 475 along its circumference, the dam 47 does not cut off communication between the internal space 510 and the external environment.

A work in progress 8 is obtained as a result of the bonding step described above. The work in progress 8 is an intermediate product obtained during the manufacturing process of the glass panel unit according to the exemplary embodiment.

In the work in progress 8, the first substrate 10 including the glass pane 105 and having the evacuation port 50 and the second substrate 20 including the glass pane 205 are bonded together with the first sealing material 410 in a frame shape. Between the first substrate 10 and the second substrate 20, the internal space 510 has been created to be surrounded with the first sealing material 410. In the internal space 510, the dam 47 with the cut 475 is arranged as a ring surrounding the opening formed by the evacuation port 50. The dam 47 is hermetically bonded onto the first substrate 10 and the second substrate 20 except the circumferential portion thereof (i.e., the cut 475).

In the embodiment described above, the dam 47 has only one cut 475. However, this is only an example and should not be construed as limiting. Alternatively, the dam 47 may have a plurality of cuts that are spaced apart from each other along its circumference.

Subjecting this work in progress 8 to the process of sealing the evacuation port 50 up while keeping the internal space 510 evacuated completes the glass panel unit according to the exemplary embodiment. That is to say, the glass panel unit according to the exemplary embodiment is manufactured by further performing the evacuating step and the sealing step on the work in progress 8.

The evacuating step and the sealing step are performed in this order with the system shown in FIGS. 7-10. This system includes: an evacuating mechanism 71 including an evacuation head 75 to be pressed against the work in progress 8; a heating mechanism 72 (see FIGS. 9 and 10) arranged opposite from the evacuation head 75 with respect to the work in progress 8; and a pressing mechanism 73 installed in the evacuation head 75.

The evacuation head 75 is configured to evacuate, through the evacuation port 50, the internal space 510 created in the work in progress 8 and keep the internal space 510 evacuated.

The evacuation head 75 includes a head body 751 in a cylindrical shape with a closed bottom and a connection pipe 753 extended from the head body 751. The head body 751 has a space 752 formed inside and an opening 754 to expose the space 752 to the external environment. An O-ring 755 with elasticity is arranged on an area, surrounding the opening 754, of the head body 751. The connection pipe 753 is configured to allow the space 752 inside the head body 751 to communicate with a suction device such as a vacuum pump.

The pressing mechanism 73 includes a press member 731 in a block shape and a spring 733 coupling the press member 731 onto an internal bottom face of the head body 751. The spring 733 is located in the space 752. The pressing mechanism 73 is configured to press, in a state where the internal space 510 is evacuated by the evacuating mechanism 71, the second sealing material 420 inserted into the evacuation port 50 toward the second substrate 20. Note that the pressing mechanism 73 may have any other configuration as long as the pressing mechanism 73 is able to press the second sealing material 420 down toward the second substrate 20.

In the evacuating step, the evacuation head 75 may be used in the following manner.

Figure 7:
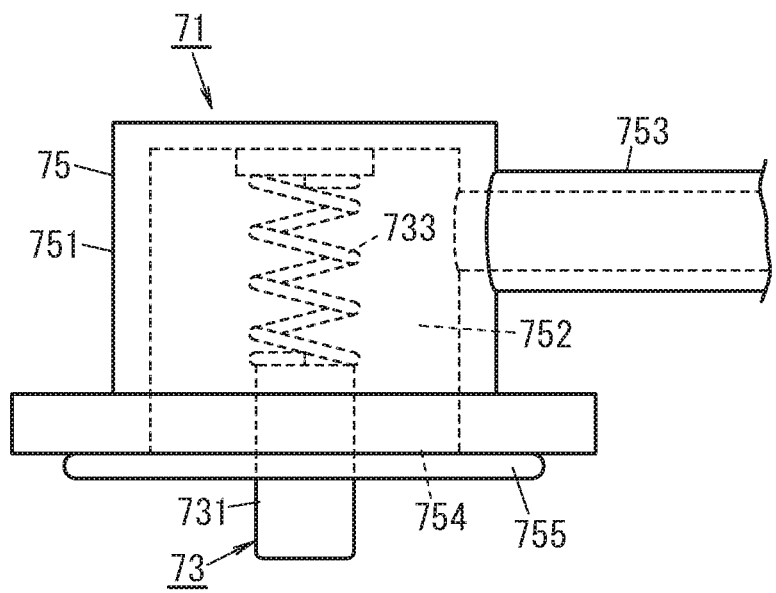
FIG. 7 is a side view illustrating a main part in a state of an evacuating step as a process step for manufacturing the glass panel unit.
Figure 7:
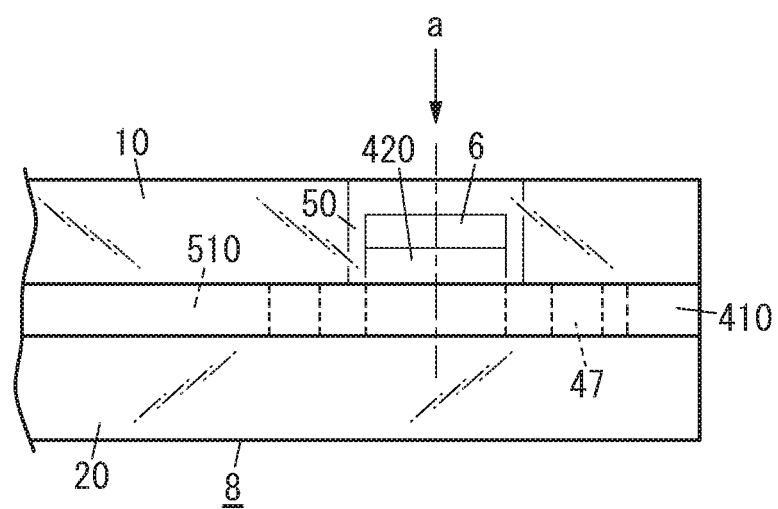

First of all, as shown in FIG. 7, the work in progress 8 is loaded into the system with the opening of evacuation port 50 facing upward (such that the first substrate 10 is located over the second substrate 20). The evacuation head 7 is placed in position with its opening 754 facedown. This places the press member 731 in position over the evacuation port 50.

By this time, the second sealing material 420 and the plate 6 for pressing the second sealing material 420 toward the second substrate 20 have been inserted in this order into the evacuation port 50 of the work in progress 8. The second sealing material 420 may be a solid sealing material of a glass frit, for example.

The second sealing material 420 and the plate 6 each have a smaller outer dimension than the evacuation port 50 so as to be insertable into the evacuation port 50. The plate 6 inserted into the evacuation port 50 is located so as to sandwich the second sealing material 420 between itself and the second substrate 20.

Figure 8:
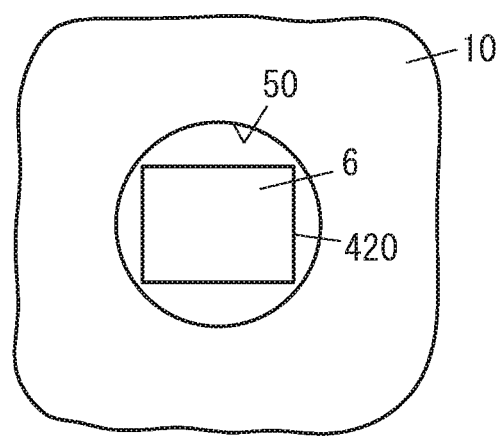
FIG. 8 is a plan view as viewed along the arrow "a" shown in FIG. 7.

When viewed along the center axis of the evacuation port 50 (as indicated by the one-dot chain in FIG. 7) while the second sealing material 420 is in solid state (i.e., not melted yet), the evacuation port 50 and the second sealing material 420 have dissimilar shapes, and the evacuation port 50 and the plate 6 also have dissimilar shapes, as shown in FIG. 8.

Specifically, the evacuation port 50 is a circular hole penetrating through the first substrate 10. When viewed along the center axis of the evacuation port 50, the evacuation port 50 has a circular shape.

When viewed along the center axis of the evacuation port 50 after having been inserted into the evacuation port 50, the second sealing material 420 and the plate 6 have a quadrangular shape. The second sealing material 420 and the plate 6 have the same shape.

Figure 9:
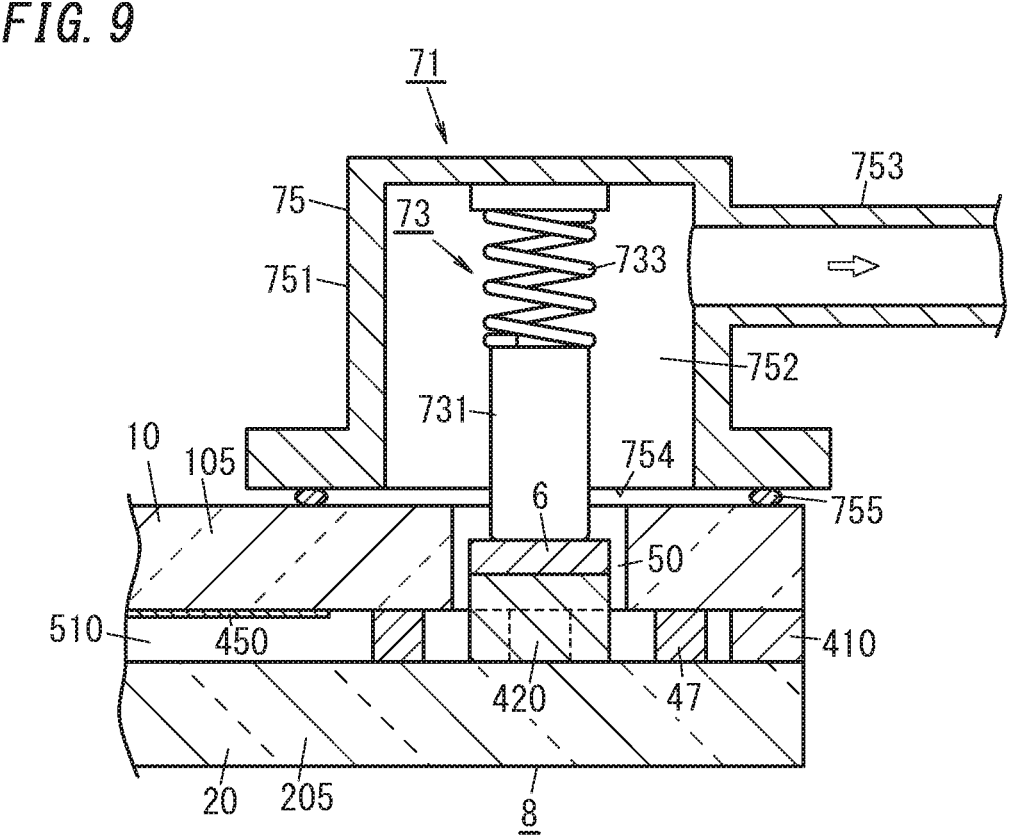
FIG. 9 is a partially cutaway side view illustrating a main part in the next state of the evacuating step.
Figure 9:
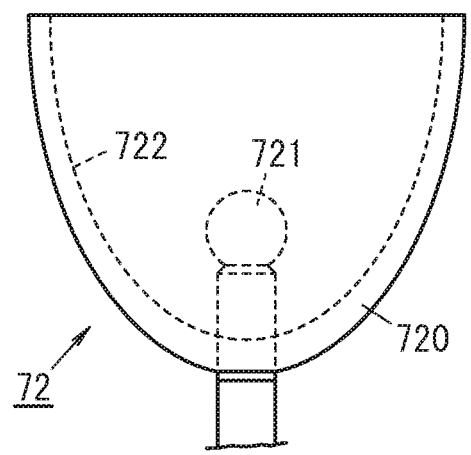

Next, as shown in FIG. 9, the evacuation head 75 is lowered to press the lower surface of the press member 731 against the upper surface of the plate 6. This brings the O-ring 755 of the evacuation head 75 into airtight contact with an area, surrounding the evacuation port 50 entirely, of the upper surface of the first substrate 10.

The presence of the O-ring 755 between the first substrate 10 and the head body 751 allows the space 752 inside the head body 751 and the evacuation port 50 to communicate with each other hermetically.

At this time, the second sealing material 420 and the plate 6 mounted thereon are vertically sandwiched between the second substrate 20 and the press member 731 under the biasing force applied by the spring 733. In this evacuating step, the pressing mechanism 73 functions as a holding mechanism for holding the second sealing material 420 and the plate 6 in the evacuation port 50.

In this state, the air in the space 752 inside the head body 751 is exhausted through the connection pipe 753 (as indicated by the open arrow in FIG. 9). Although the second sealing material 420 and the plate 6 are inserted into the evacuation port 50, a gap wide enough to let the air pass through is left between the inner peripheral face of the evacuation port 50 and the outer peripheral surface of the second sealing material 420, a gap wide enough to let the air pass through is also left between the evacuation port 50 and the outer peripheral surface of the plate 6, and these two gaps communicate with each other.

As described above, the evacuation port 50 has a circular shape and the second sealing material 420 has a quadrangular shape. Thus, this reduces the chances of causing a significant offset between the center of the evacuation port 50 and the center of the second sealing material 420 when viewed along the center axis of the evacuation port 50. The gap between the evacuation port 50 and the second sealing material 420 is left in good balance along the circumference of the evacuation port 50.

Likewise, the evacuation port 50 has a circular shape and the plate 6 has a quadrangular shape. Thus, this reduces the chances of causing a significant offset between the center of the evacuation port 50 and the center of the plate 6 when viewed along the center axis of the evacuation port 50. The gap between the evacuation port 50 and the plate 6 is left in good balance along the circumference of the evacuation port 50.

This allows the air in the internal space 510 to be exhausted (e.g., allows the internal space 510 to be evacuated) efficiently through the evacuation port 50 cut through the first substrate 10.

Figure 10:
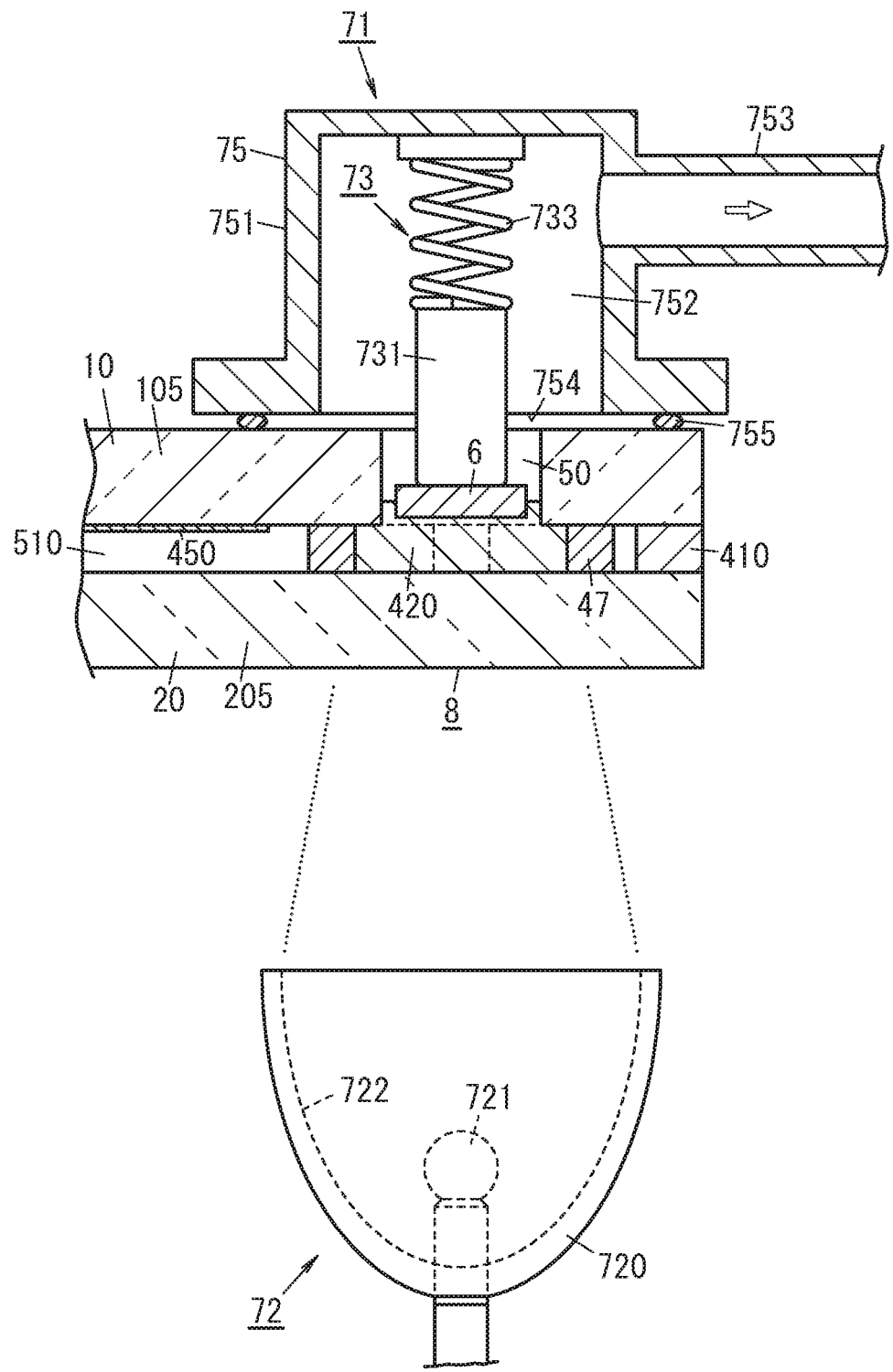
FIG. 10 is a partially cutaway side view illustrating a main part in a sealing step as a process step for manufacturing the glass panel unit.

In the sealing step, the internal space 510 is sealed up with the heating mechanism 72 shown in FIGS. 9 and 10 while being kept evacuated.

The heating mechanism 72 is configured to locally heat the second sealing material 420, inserted into the evacuation port 50, with the internal space 510 kept evacuated by the evacuating mechanism 71.

The heating mechanism 72 includes an irradiator 720 with the ability to irradiate the target with an infrared ray. The irradiator 720 is configured to irradiate the second sealing material 420, inserted into the evacuation port 50 to come into direct contact with the second substrate 20, with an infrared ray externally incident through the second substrate 20 (second glass pane 205).

The irradiator 720 includes a heat source 721 for radiating an infrared ray and a focusing member 722 for focusing the infrared ray, radiated from the heat source 721, onto a target location. As the heat source 721, a halogen lamp for radiating a near infrared ray is suitably used. Having the heat source 721 radiate a near infrared ray with a short wavelength makes the infrared ray radiated (i.e., the near infrared ray) less easily absorbable into the glass pane (such as the second glass pane 205), which is beneficial. When the irradiator 720 is configured to radiate a near infrared ray, the second sealing material 420 is suitably a black material with a high near infrared absorbance (so as to achieve a near infrared absorbance of 30% or more, for example).

When reaching a predetermined temperature, the second sealing material 420 that has been heated locally melts and softens. The second sealing material 420 that has softened is pressed down toward the second substrate 20 and deformed to collapse under the biasing force (spring force) applied by the spring 733 of the pressing mechanism 73 via the plate 6.

The second sealing material 420 is pressed and expanded perpendicularly to the direction in which the first substrate 10 and the second substrate 20 face each other and deformed to the point of coming into contact with the inner peripheral face of the dam 47 in the internal space 510. Bringing the second sealing material 420 into contact with the dam 47 reduces further expansion of the second sealing material 420.

Stopping heating the second sealing material 420 at this stage makes the second sealing material 420 that has been deformed cured in that deformed shape. This causes the evacuation port 50 to be sealed up with the second sealing material 420 cured, and the internal space 510 is hermetically sealed up while being kept evacuated. As shown in FIG. 10, the second sealing material 420 that has been deformed is bonded onto both of the first substrate 10 and the second substrate 20 in the internal space 510 and is bonded to the plate 6 as well.

The second sealing material 420 that has been deformed constitutes the second sealing portion 42 of the glass panel unit according to the exemplary embodiment. The glass panel unit according to the exemplary embodiment has the evacuated internal space 510, and therefore, exhibits excellent thermal insulation properties. In addition, the evacuation port 50 used for evacuation is hermetically sealed up with the second sealing material 420 that has been deformed. Therefore, the glass panel unit according to the exemplary embodiment leaves no traces of the evacuation pipe unlike the known art.

As described above, in the glass panel unit manufacturing method according to this embodiment, the evacuation port 50 has a circular shape and the second sealing material 420 has a quadrangular shape. This reduces the chances of causing an offset of the center of the second sealing material 420 from the center of the evacuation port 50 with a sufficient gap left between the evacuation port 50 and the second sealing material 420. Thus, the evacuating step allows the internal space 510 to be evacuated efficiently through the evacuation port 50, and the sealing step allows the evacuation port 50 to be sealed up with reliability with the second sealing material 420 deformed.

In the glass panel unit according to the exemplary embodiment, the evacuation port 50 is provided at only one location of the first substrate 10. Alternatively, a plurality of evacuation ports 50 may be provided at multiple locations of the first substrate 10. Even in such an alternative embodiment, each of those evacuation ports 50 may still be sealed up with the second sealing material 420 that has been heated and melted by using, for each of those evacuation ports 50, the evacuating mechanism 71, heating mechanism 72, and pressing mechanism 73 described above.

Also, according to the manufacturing method described above, the evacuation head 75 is connected to the first substrate 10 after the work in progress 8 has been formed. Alternatively, the evacuation head 75 may also be connected to the first substrate 10 while the work in progress 8 is still being formed (i.e., at the stage of the bonding step). Nevertheless, to prevent the second sealing material 420 from melting in the bonding step, a material having a higher melting point than the first sealing material 410 is suitably used in that case as the second sealing material 420.

The melting point of the second sealing material 420 is suitably higher by 30-200° C. than the melting point of the first sealing material 410. If the melting point of the second sealing material 420 were higher than the melting point of the first sealing material 410 by more than 200° C., then the chances of causing cracks in at least one of the first and second substrates 10 and 20 would increase.

Also, in the glass panel unit manufacturing method according to the exemplary embodiment, the plate 6 is left in the evacuation port 50. If necessary, the plate 6 may be removed after the evacuation port 50 has been sealed up.

Furthermore, in the glass panel unit manufacturing method according to the exemplary embodiment, the second sealing material 420 and the plate 6 are inserted into the evacuation port 50 and the second sealing material 420 is pressed toward the second substrate 20 via the plate 6. However, this is only an example and should not be construed as limiting. Alternatively, no plate 6 may be inserted into the evacuation port 50. In that case, the second sealing material 420 may be inserted into the evacuation port 50 and may be pressed directly by the pressing mechanism 73 (i.e., the press member 731).

Furthermore, according to the manufacturing method described above, the glass panel unit is manufactured by performing the bonding step, the evacuating step, and then the sealing step. However, this is only an example and should not be construed as limiting. Alternatively, the glass panel unit may also be manufactured by further performing a cutting step after the sealing step. The cutting step includes cutting either the first substrate 10 or the second substrate 20, or both, after the sealing step has been performed.

Next, variations (namely, first through eighth variations) of the manufacturing method described above will be described sequentially. In the following description of variations, any constituent member having the same function as a counterpart of the exemplary embodiment described above will be designated by the same reference numeral as that counterpart's, and a detailed description thereof will be omitted herein.

Note that according to any of the first through eighth variations to be described below, the evacuating step also allows the internal space 510 to be evacuated no less efficiently and the sealing step also allows the evacuated internal space 510 to be sealed up no less hermetically.

(First Variation)

Figure 11:
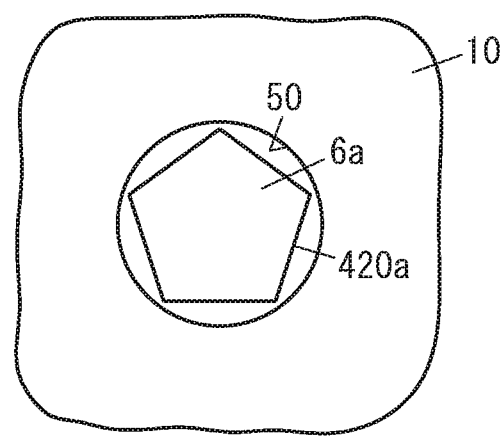
FIG. 11 is a plan view illustrating a main part in an evacuating step according to a first variation.

FIG. 11 illustrates a state where a solid second sealing material 420a and a plate 6a are inserted into the evacuation port 50 in the evacuating step according to a first variation.

In the first variation, when viewed along the center axis of the evacuation port 50, the evacuation port 50 has a circular shape and the second sealing material 420a and the plate 6a have a pentagonal shape as shown in FIG. 11. The second sealing material 420a and the plate 6a have the same shape. As used herein, the term "circular shape" does not always refer to a perfect circle.

Also, the second sealing material 420 and the plate 6 only need to have a polygonal shape. For example, the second sealing material 420 and the plate 6 may have a triangular shape or a hexagonal shape as well.

If the second sealing material 420 has a polygonal shape, each of the plurality of corners of the second sealing material 420 is able to come into contact with the inner peripheral surface of the evacuation port 50. Likewise, if the plate 6 has a polygonal shape, each of the plurality of corners of the plate 6 is able to come into contact with the inner peripheral surface of the evacuation port 50.

(Second Variation)

Figure 12:
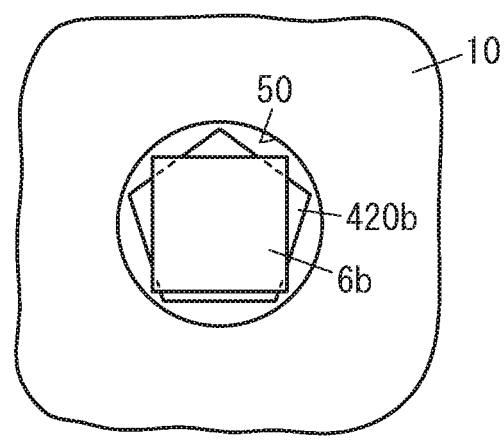
FIG. 12 is a plan view illustrating a main part in an evacuating step according to a second variation.

FIG. 12 illustrates a state where a solid second sealing material 420b and a plate 6b are inserted into the evacuation port 50 in the evacuating step according to a second variation.

In the second variation, when viewed along the center axis of the evacuation port 50, the evacuation port 50 has a circular shape, the second sealing material 420b has a pentagonal shape, and the plate 6b has a quadrangular shape as shown in FIG. 12. In the second variation, the second sealing material 420b and the plate 6b have mutually different shapes.

The second sealing material 420b and the plate 6b only need to have mutually different polygonal shapes. For example, the second sealing material 420b may have a quadrangular shape and the plate 6 may have a pentagonal shape instead.

(Third Variation)

Figure 13:
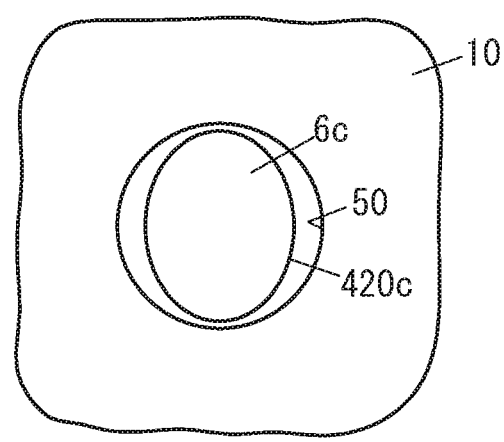
FIG. 13 is a plan view illustrating a main part in an evacuating step according to a third variation.

FIG. 13 illustrates a state where a solid second sealing material 420c and a plate 6c are inserted into the evacuation port 50 in the evacuating step according to a third variation.

In the third variation, when viewed along the center axis of the evacuation port 50, the evacuation port 50 has a circular shape and the second sealing material 420c and the plate 6c have an elliptical shape as shown in FIG. 13.

In the third variation, the second sealing material 420c and the plate 6c have the same shape. However, this is only an example and should not be construed as limiting. Alternatively, the second sealing material 420 and the plate 6c may have mutually different elliptical shapes. Still alternatively, one of the second sealing material 420c or the plate 6c may have an elliptical shape and the other may have a polygonal shape as well.

(Fourth Variation)

Figure 14:
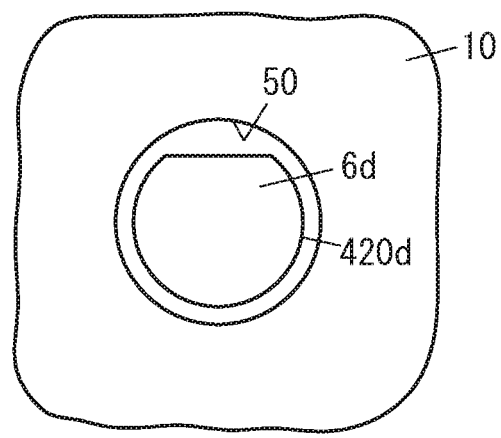
FIG. 14 is a plan view illustrating a main part in an evacuating step according to a fourth variation.

FIG. 14 illustrates a state where a solid second sealing material 420d and a plate 6d are inserted into the evacuation port 50 in the evacuating step according to a fourth variation.

In the fourth variation, when viewed along the center axis of the evacuation port 50, the evacuation port 50 has a circular shape and the second sealing material 420d and the plate 6d have the shape of a truncated circle as shown in FIG. 14.

In this variation, the second sealing material 420d and the plate 6d have the shape of a circle, of which a circumferential portion is truncated. However, this is only an example and should not be construed as limiting. Alternatively, the second sealing material 420d and the plate 6d may also have the shape of a circle, of which multiple circumferential portions are truncated.

In this variation, the second sealing material 420d and the plate 6d have the same shape. However, this is only an example and should not be construed as limiting. Alternatively, the second sealing material 420d and the plate 6d may have mutually different shapes.

For example, one of the second sealing material 420d or the plate 6d may have the shape of a truncated circle and the other may have a polygonal or elliptical shape as well.

(Fifth Variation)

Figure 15:
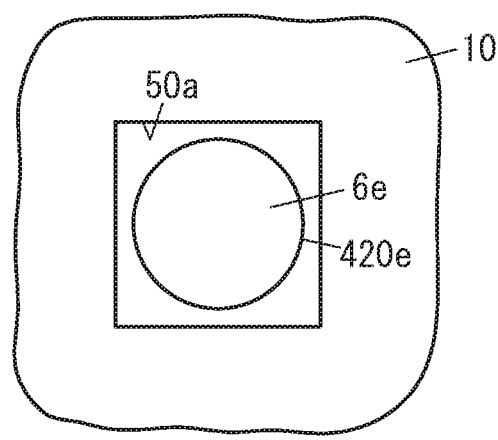
FIG. 15 is a plan view illustrating a main part in an evacuating step according to a fifth variation.

FIG. 15 illustrates a state where a solid second sealing material 420 and a plate 6 are inserted into an evacuation port 50a in the evacuating step according to a fifth variation.

In the fifth variation, when viewed along the center axis of the evacuation port 50a, the second sealing material 420e and the plate 6e have a circular shape and the evacuation port 50a has a quadrangular shape as shown in FIG. 15.

The evacuation port 50a does not have to have a quadrangular shape but only needs to have a polygonal shape. For example, the evacuation port 50a may also have a triangular or hexagonal shape. Optionally, the second sealing material 420e and the plate 6e may have mutually different shapes.

(Sixth Variation)

Figure 16:
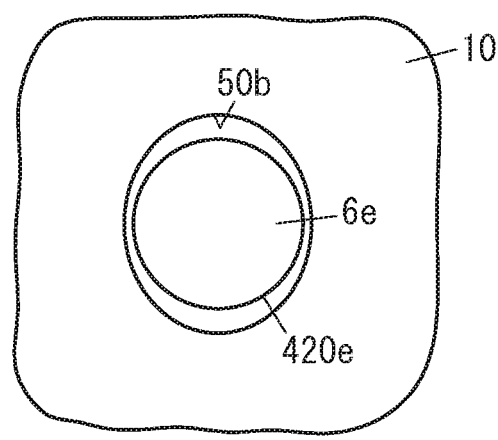
FIG. 16 is a plan view illustrating a main part in an evacuating step according to a sixth variation.

FIG. 16 illustrates a state where a solid second sealing material 420e and a plate 6e are inserted into an evacuation port 50b in the evacuating step according to a sixth variation.

In the sixth variation, when viewed along the center axis of the evacuation port 50b, the second sealing material 420e and the plate 6e have a circular shape and the evacuation port 50b has an elliptical shape as shown in FIG. 16. Alternatively, the second sealing material 420e and the plate 6e may have mutually different shapes.

(Seventh Variation)

Figure 17:
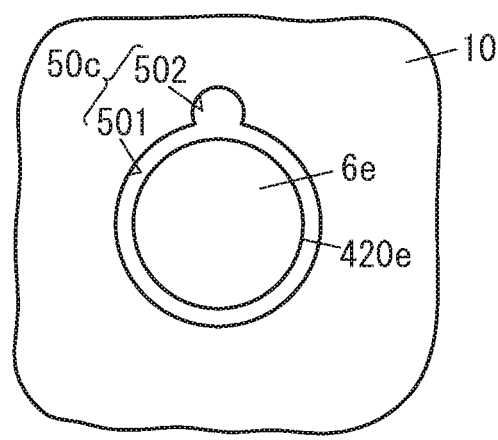
FIG. 17 is a plan view illustrating a main part in an evacuating step according to a seventh variation.

FIG. 17 illustrates a state where a solid second sealing material 420e and a plate 6e are inserted into an evacuation port 50c in the evacuating step according to a seventh variation.

In the seventh variation, when viewed along the center axis of the evacuation port 50c, the second sealing material 420e and the plate 6e have a circular shape as shown in FIG. 17. The evacuation port 50c includes a first evacuation port 501 having a larger dimension than the second sealing material 420e and the plate 6e and a second evacuation port 502 communicating with a circumferential portion of the first evacuation port 501. The first evacuation port 501 has a circular shape and the second evacuation port 502 has the shape of a circle with a smaller diameter than the first evacuation port 501.

In this variation, the shape of the first evacuation port 501 is similar to that of the second sealing material 420e and the plate 6e. However, this is only an example and should not be construed as limiting. Alternatively, the shape of the first evacuation port 501 may be dissimilar to that of the second sealing material 420e, and/or the shape of the first evacuation port 501 may also be dissimilar to that of the plate 6e.

For example, the second sealing material 420e and the plate 6e may have a circular shape and the first evacuation port 501 may have an elliptical or polygonal shape. Alternatively, the first evacuation port 501 may have a circular shape and the second sealing material 420e and the plate 6e may have an elliptical shape, a polygonal shape, or the shape of a truncated circle. Optionally, the second sealing material 420e and the plate 6e may have mutually different shapes.

The second evacuation port 502 does not have to have a circular shape but may also have any other shape such as an elliptical or polygonal shape.

In this variation, only one second evacuation port 502 is provided. However, this is only an example and should not be construed as limiting. Alternatively, the evacuation port 50c may include a plurality of second evacuation ports 502. In that case, the plurality of second evacuation ports 502 suitably communicate with mutually different circumferential portions of the first evacuation port 501.

(Eighth Variation)

Figure 18:
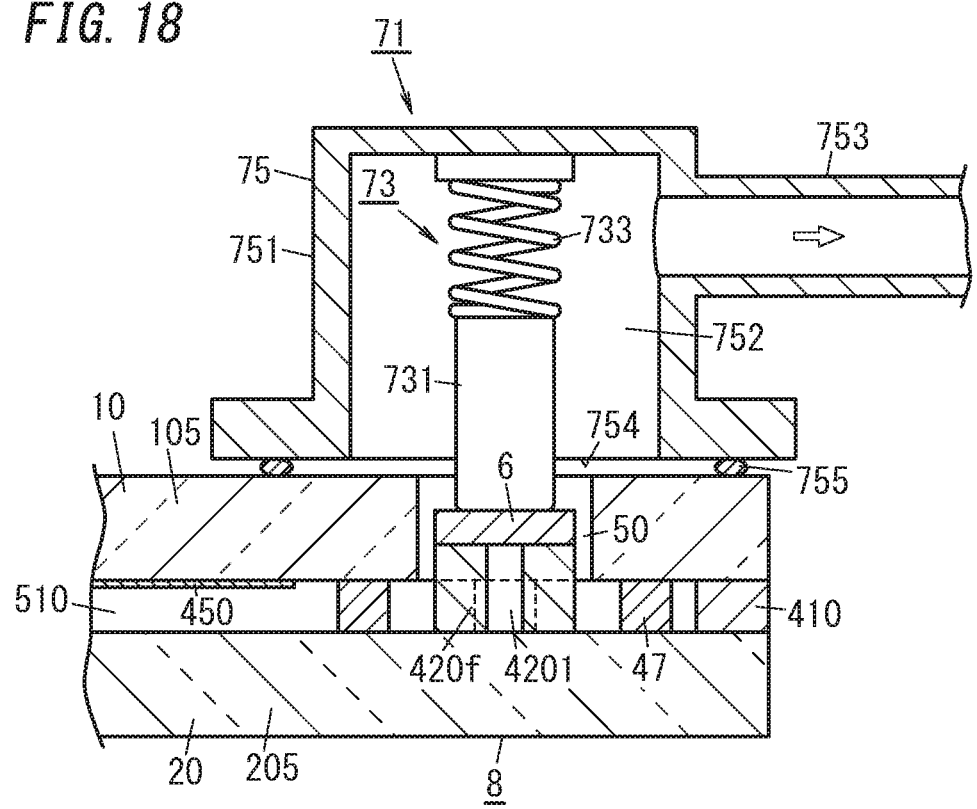
FIG. 18 is a partially cutaway side view illustrating a main part in an evacuating step according to an eighth variation.
Figure 18:
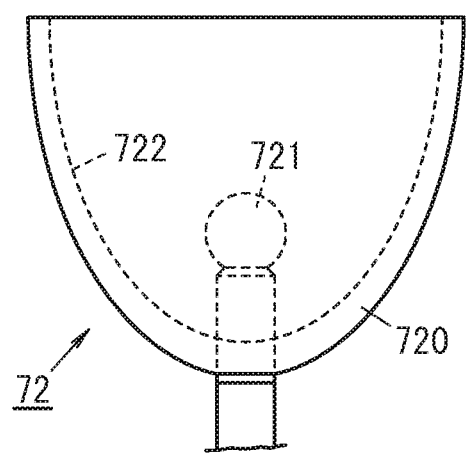

FIG. 18 is a partially cutaway side view illustrating a state where a solid second sealing material 420f and a plate 6 are inserted into the evacuation port 50 in the evacuating step according to an eighth variation.

The second sealing material 420f has the shape of a bottomless cylinder with a through hole 4201. A first end of the through hole 4201 is open toward the second substrate 20, while a second end of the through hole 4201 is open toward the plate 6.

In the sealing step according to the eighth variation, when an infrared ray is radiated from an irradiator 720 toward the second sealing material 420f, part of the infrared ray radiated is directly absorbed into, and thereby locally heats, the second sealing material 420f. In addition, another part of the infrared ray radiated passes through the through hole 4201 of the second sealing material 420f, and is absorbed into, and thereby locally heats, the plate 6. The plate 6 that has had its temperature increased due to the local heating in turn heats the second sealing material 420f.

That is to say, in the sealing step according to the eighth variation, the second sealing material 420f with the through hole 4201 is not only locally heated directly by irradiation with the infrared ray but also locally heated indirectly via the plate 6.

Aspects

As can be seen from the foregoing description of the exemplary embodiment and first through eighth variations thereof, a glass panel unit manufacturing method according to a first aspect includes a bonding step, an evacuating step, and a sealing step. The bonding step includes bonding together a first substrate (10) and a second substrate (20) with a first sealing material (410) in a frame shape interposed between the first substrate (10) and the second substrate (20) to create, between the first substrate (10) and the second substrate (20), an internal space (510) surrounded with the first sealing material (410). The first substrate (10) includes a glass pane (105) and has an evacuation port (50). The second substrate (20) includes another glass pane (205). The evacuating step includes evacuating the internal space (510) through the evacuation port (50) of the first substrate (10). The sealing step includes sealing the evacuation port (50) up while keeping the internal space (510) evacuated. The sealing step includes heating and melting a second sealing material (420; 420*a*; 420*b*; 420*c*; 420*d*; 420*e*) inserted into the evacuation port (50; 50*a*; 50*b*; 50*c*), while pressing the second sealing material (420; 420*a*; 420*b*; 420*c*; 420*d*; 420*e*) toward the second substrate (20), and thereby sealing the evacuation port (50; 50*a*; 50*b*; 50*c*) up with the second sealing material (420; 420*a*; 420*b*; 420*c*; 420*d*; 420*e*) thus melted. The evacuation port (50; 50*a*; 50*b*; 50*c*) and the second sealing material (420; 420*a*; 420*b*; 420*c*; 420*d*; 420*e*) have dissimilar shapes when viewed along a center axis of the evacuation port (50; 50*a*; 50*b*; 50*c*) in a state where the second sealing material (420; 420*a*; 420*b*; 420*c*; 420*d*; 420*e*) has been inserted into the evacuation port (50; 50*a*; 50*b*; 50*c*) but has not melted yet.

A glass panel unit manufactured by the glass panel unit manufacturing method according to the first aspect has an evacuated internal space (510), and therefore, exhibits excellent thermal insulation properties. The evacuation port (50; 50*a*; 50*b*; 50*c*) used to evacuate the internal space (510) is sealed up with the second sealing material (420; 420*a*; 420*b*; 420*c*; 420*d*; 420*e*), thus leaving no traces of an evacuation pipe unlike the known art. The evacuating step allows the internal space (510) to be evacuated efficiently through a gap left between the evacuation port (50; 50*a*; 50*b*; 50*c*) and the second sealing material (420; 420*a*; 420*b*; 420*c*; 420*d*; 420*e*). The sealing step allows the evacuation port (50; 50*a*; 50*b*; 50*c*) to be sealed up hermetically with the second sealing material (420; 420*a*; 420*b*; 420*c*; 420*d*; 420*e*).

As can be seen from the foregoing description of the exemplary embodiment and first through fourth variations thereof, a glass panel unit manufacturing method according to a second aspect is implemented in combination with the first aspect. In the glass panel unit manufacturing method according to the second aspect, the evacuation port (50) has a circular shape.

As can be seen from the foregoing description of the exemplary embodiment and first and second variations thereof, a glass panel unit manufacturing method according to a third aspect is implemented in combination with the second aspect. In the glass panel unit manufacturing method according to the third aspect, the second sealing material (420; 420*a*; 420*b*) has a polygonal shape.

As can be seen from the foregoing description of the third variation, a glass panel unit manufacturing method according to a fourth aspect is implemented in combination with the second aspect. In the glass panel unit manufacturing method according to the fourth aspect, the second sealing material (420*c*) has an elliptical shape.

As can be seen from the foregoing description of the fourth variation, a glass panel unit manufacturing method according to a fifth aspect is implemented in combination with the second aspect. In the glass panel unit manufacturing method according to the fifth aspect, the second sealing material (420*d*) has the shape of a truncated circle.

As can be seen from the foregoing description of the fifth through seventh variations, a glass panel unit manufacturing method according to a sixth aspect is implemented in combination with the first aspect. In the glass panel unit manufacturing method according to the sixth aspect, the second sealing material (420*e*) has a circular shape.

As can be seen from the foregoing description of the fifth variation, a glass panel unit manufacturing method according to a seventh aspect is implemented in combination with the sixth aspect. In the glass panel unit manufacturing method according to the seventh aspect, the evacuation port (50*a*) has a polygonal shape.

As can be seen from the foregoing description of the sixth variation, a glass panel unit manufacturing method according to an eighth aspect is implemented in combination with the sixth aspect. In the glass panel unit manufacturing method according to the eighth aspect, the evacuation port (50*b*) has an elliptical shape.

As can be seen from the foregoing description of the seventh variation, a glass panel unit manufacturing method according to a ninth aspect is implemented in combination with the first aspect. In the glass panel unit manufacturing method according to the ninth aspect, the evacuation port (50*c*) includes: a first evacuation port (501) having a larger dimension than the second sealing material (420*e*); and a second evacuation port (502) communicating with a circumferential portion of the first evacuation port (501).

As can be seen from the foregoing description of the exemplary embodiment and first through eighth variations thereof, a glass panel unit manufacturing method according to a tenth aspect is implemented in combination with any one of the first to ninth aspects. In the glass panel unit manufacturing method according to the tenth aspect, the sealing step includes heating and melting the second sealing material (420; 420*a*; 420*b*; 420*c*; 420*d*; 420*e*) inserted into the evacuation port (50; 50*a*; 50*b*; 50*c*) while pressing the second sealing material (420; 420*a*; 420*b*; 420*c*; 420*d*; 420*e*) toward the second substrate (20) via a plate (6; 6*a*; 6*b*; 6*c*; 6*d*; 6*e*) and thereby sealing the evacuation port (50; 50*a*; 50*b*; 50*c*) up with the second sealing material (420; 420*a*; 420*b*; 420*c*; 420*d*; 420*e*) thus melted. The evacuation port (50; 50*a*; 50*b*; 50*c*) and the plate (6; 6*a*; 6*b*; 6*c*; 6*d*; 6*e*) have dissimilar shapes when viewed along the center axis of the evacuation port (50; 50*a*; 50*b*; 50*c*).

As can be seen from the foregoing description of the exemplary embodiment and first through eighth variations thereof, a glass panel unit manufacturing method according to an eleventh aspect is implemented in combination with any one of the first to tenth aspects. In the glass panel unit manufacturing method according to the eleventh aspect, the evacuating step includes evacuating the internal space (510) with an evacuation head (7) pressed against the first substrate (10). The sealing step includes heating and melting the second sealing material (420; 420*a*; 420*b*; 420*c*; 420*d*; 420*e*) while pressing the second sealing material (420; 420*a*; 420*b*; 420*c*; 420*d*; 420*e*) toward the second substrate (20) with a pressing mechanism (73) installed in the evacuation head (7).

As can be seen from the foregoing description of the exemplary embodiment and first through eighth variations thereof, a glass panel unit manufacturing method according to a twelfth aspect is implemented in combination with any one of the first to eleventh aspects. In the glass panel unit manufacturing method according to the twelfth aspect, the sealing step includes locally heating the second sealing material (420; 420*a*; 420*b*; 420*c*; 420*d*; 420*e*) by irradiating the second sealing material (420; 420*a*; 420*b*; 420*c*; 420*d*; 420*e*) with an infrared ray through the second substrate (20).

As can be seen from the foregoing description of the exemplary embodiment and first through eighth variations thereof, a glass panel unit manufacturing method according to a thirteenth aspect is implemented in combination with any one of the first to twelfth aspects. In the glass panel unit manufacturing method according to the thirteenth aspect, the sealing step includes pressing and expanding, in the internal space (510), the second sealing material (420; 420*a*; 420*b*;

420c; 420d; 420e) melted to bond the second sealing material (420; 420a; 420b; 420c; 420d; 420e) onto both of the first substrate (10) and the second substrate (20).

REFERENCE SIGNS LIST

10 First Substrate
105 Glass Pane
20 Second Substrate
205 Glass Pane
50; 50a; 50b; 50c Evacuation Port
501 First Evacuation Port
502 Second Evacuation Port
6; 6a, 6b; 6c; 6d; 6e Plate
410 First Sealing Material
420; 420a; 420b; 420c; 420d; 420e Second Sealing Material
510 Internal Space

The invention claimed is:

1. A glass panel unit manufacturing method comprising:
a bonding step of bonding together a first substrate and a second substrate with a first sealing material in a frame shape interposed between the first and second substrates to create, between the first and second substrates, an internal space surrounded with the first sealing material, the first substrate including a glass pane and having an evacuation port, and the second substrate including another glass pane;
an evacuating step of evacuating the internal space through the evacuation port of the first substrate; and
a sealing step of sealing the evacuation port up while keeping the internal space evacuated,
the sealing step including heating and melting a solid second sealing material inserted into the evacuation port to come into direct contact with the second substrate, while pressing the second sealing material toward the second substrate, and thereby sealing the evacuation port up with the second sealing material thus melted,
the evacuation port and the second sealing material having mutually dissimilar shapes when viewed along a center axis of the evacuation port in a state where the second sealing material has been inserted into the evacuation port but has not melted yet.

2. The glass panel unit manufacturing method of claim 1, wherein the evacuation port has a circular shape.

3. The glass panel unit manufacturing method of claim 2, wherein the second sealing material has a polygonal shape.

4. The glass panel unit manufacturing method of claim 2, wherein the second sealing material has an elliptical shape.

5. The glass panel unit manufacturing method of claim 2, wherein the second sealing material has a shape of a truncated circle.

6. The glass panel unit manufacturing method of claim 1, wherein the second sealing material has a circular shape.

7. The glass panel unit manufacturing method of claim 6, wherein the evacuation port has a polygonal shape.

8. The glass panel unit manufacturing method of claim 6, wherein the evacuation port has an elliptical shape.

9. The glass panel unit manufacturing method of claim 1, wherein the evacuation port includes: a first evacuation port having a larger dimension than the second sealing material; and a second evacuation port communicating with a circumferential portion of the first evacuation port.

10. The glass panel unit manufacturing method of claim 1, wherein
the sealing step includes heating and melting the second sealing material inserted into the evacuation port, while pressing the second sealing material toward the second substrate via a plate, and thereby sealing the evacuation port up with the second sealing material thus melted, and
the evacuation port and the plate have mutually dissimilar shapes when viewed along the center axis of the evacuation port.

11. The glass panel unit manufacturing method of claim 1, wherein
the evacuating step includes evacuating the internal space with an evacuation head pressed against the first substrate, and
the sealing step includes heating and melting the second sealing material while pressing the second sealing material toward the second substrate with a pressing mechanism installed in the evacuation head.

12. The glass panel unit manufacturing method of claim 1, wherein the sealing step includes locally heating the second sealing material by irradiating the second sealing material with an infrared ray through the second substrate.

13. The glass panel unit manufacturing method of claim 1, wherein the sealing step includes pressing and expanding, in the internal space, the second sealing material melted to bond the second sealing material onto both of the first and second substrates.

* * * * *